(12) United States Patent
Schulz et al.

(10) Patent No.: US 6,311,764 B1
(45) Date of Patent: Nov. 6, 2001

(54) CEILING COOLING OR HEATING APPARATUS

(75) Inventors: Uwe W. Schulz, Staefa (CH); Olivier Josserand, Montluel (FR)

(73) Assignee: Carrier Corporation, Syracuse, NY (US)

(*) Notice: Subject to any disclaimer, the term of this patent is extended or adjusted under 35 U.S.C. 154(b) by 499 days.

(21) Appl. No.: 08/730,516

(22) Filed: Oct. 11, 1996

(51) Int. Cl.[7] .................... F24D 3/16; F24D 3/12; F24H 9/08
(52) U.S. Cl. .............. 165/56; 165/49; 165/171; 237/69
(58) Field of Search .............. 165/49, 56, 171; 237/69

(56) References Cited

U.S. PATENT DOCUMENTS

| | | | | |
|---|---|---|---|---|
| 1,847,573 | * | 3/1932 | Rupp | 165/171 |
| 2,677,749 | * | 5/1954 | Raider | 165/49 |
| 2,722,266 | * | 11/1955 | Kersten | 237/12.3 A |
| 2,751,198 | * | 6/1956 | Rapp | 165/56 |
| 2,845,252 | * | 7/1958 | Parkinson et al. | 165/56 |
| 3,372,740 | * | 3/1968 | Kastovich et al. | 165/171 |
| 4,205,719 | * | 6/1980 | Norell et al. | 165/49 |
| 5,042,570 | * | 8/1991 | Schmitt-Raisel et al. | 165/56 |

FOREIGN PATENT DOCUMENTS

| | | | | |
|---|---|---|---|---|
| 730361 | * | 3/1966 | (CA) | 165/171 |
| 2602272 | * | 8/1977 | (DE) | 165/49 |
| 2912594 | * | 10/1980 | (DE) | 237/69 |
| 865132 | * | 5/1941 | (FR) | 237/69 |
| 61-153324 | * | 7/1985 | (JP) | 237/69 |
| 3-175218 | * | 7/1991 | (JP) | 237/69 |

OTHER PUBLICATIONS

Ashrae Systems Handbook 1984 pages 8.9 and 8–10, Panel Heating and Cooling systems, Ashrae Publishing, 1984.*

* cited by examiner

Primary Examiner—John K. Ford

(57) ABSTRACT

Ceiling apparatus for heating or cooling a space includes one or more spiral shaped coils mounted to individual thermally conductive ceiling tiles suspended above the space to be heated or cooled. The spiral shaped coils are interconnected by flexible hose connections so as to define one or more paths of a heat exchange fluid flowing through the coils so as to provide or remove heat from the ceiling tiles.

9 Claims, 5 Drawing Sheets

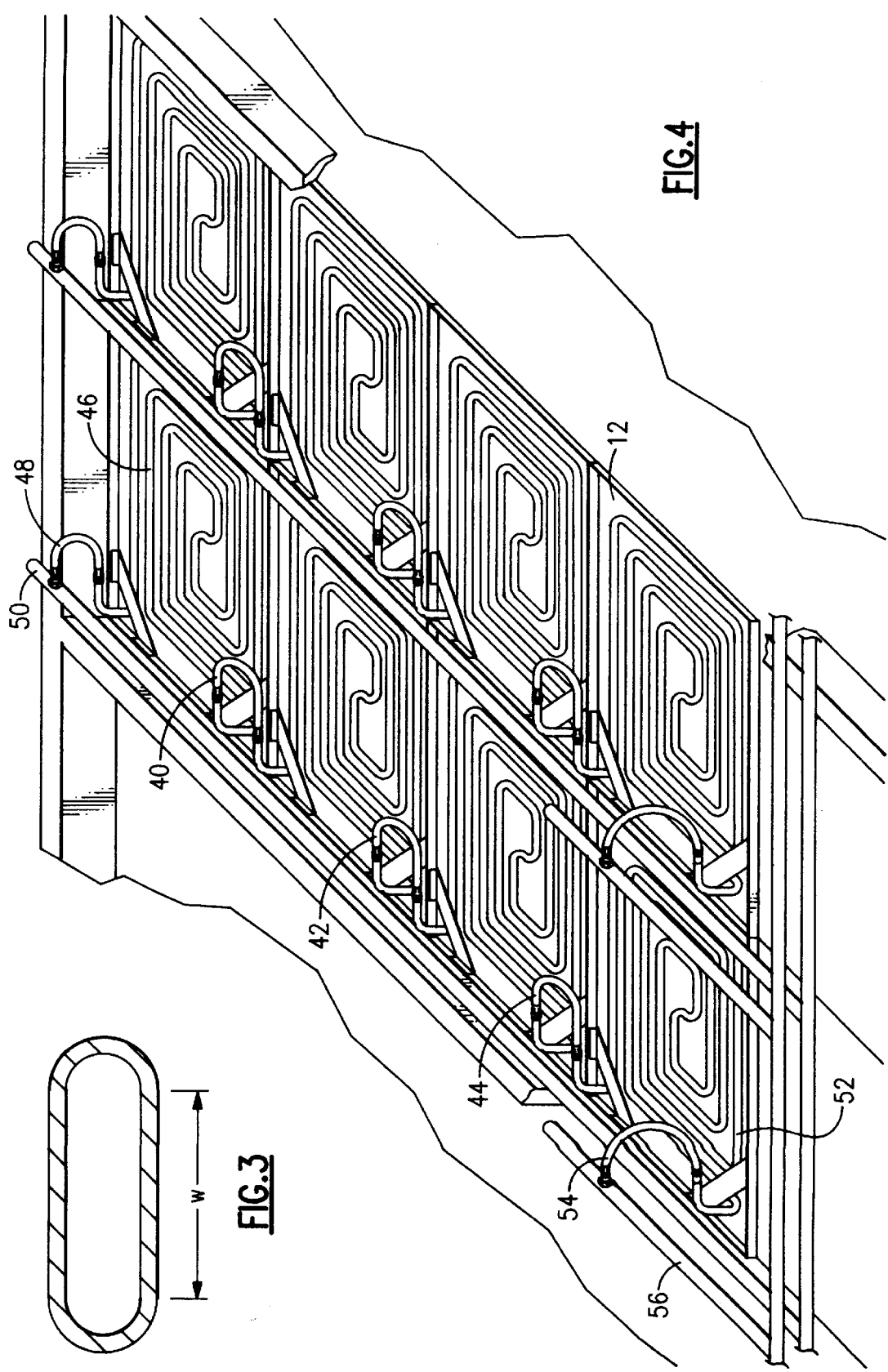

CEILING COOLING OR HEATING APPARATUS

BACKGROUND OF THE INVENTION

This invention relates to cooling or heating apparats to be used with suspended ceiling configurations in a home, office or other commercial or industrial buildings.

It has heretofore been known to mount relatively thin metal tiles in a suspended ceiling configuration of a room or space and to provide apparatus for cooling or heating such mounted tiles. The heating or cooling apparatus typically comprises straight tubes which run back and forth over the top surfaces of the tiles. The tubes usually contain flowing water having a regulated temperature sufficient to provide heat to or remove heat from the tiles so as to thereby maintain the tiles at a temperature sufficient to radiantly heat or cool the room.

It has been found that the thin tiles in such a suspended ceiling configuration do not necessarily remain flat. In particular, the tiles will tend to follow the curvature of the suspended ceiling as it flexes, bends or sags due to the weight of the tubes and other loads being carried by the suspended ceiling. This causes the ceiling tiles to lose contact with the straight tubes. This loss of contact significantly impacts the heat exchange between the tiles and the tubes.

Solutions to the above loss of contact have in the past included gluing or clipping the straight tubes to the thin metal tiles in as many places as possible so as to maintain contact between the straight tubes and the tiles. This has resulted in considerable strain being placed on the straight tubing as well as the glue, or clips holding the tubing to the tiles when the ceiling sags due to the weight being carried by the suspended ceiling.

OBJECTS OF THE INVENTION

It is an object of the invention to provide heating or cooling apparatus for a suspended ceiling that maintains contact with the suspended ceiling even when the ceiling does not remain flat.

It is another object of the invention to provide heating or cooling apparatus for a suspended ceiling that maintains contact with the suspended ceiling in a manner that minimizes any stress or strain on the cooling or heating apparatus if glued or bonded to the ceiling.

SUMMARY OF THE INVENTION

The above and other objects are achieved by providing a suspended ceiling with one or more ceiling tiles that are heated or cooled by a heat exchange fluid circulating through spiral shaped coils. The ceiling files are preferably thin pieces of perforated sheet metal fabricated from galvanized steel. The perforated sheet metal may be lined with an acoustical backing. Each spiral shaped coil is preferably flattened so as to provide a flat contact surface with the ceiling tile The spiral shape allows the coil to maintain substantial contact with the ceiling tile when the ceiling tile flexes, bends or sags due to any flexing, bending or sagging of the suspended ceiling.

The outlet end of each spiral shaped coil is preferably connected by a flexible hose coupling to the inlet end of an adjacent spiral shaped coil so as to form a series of successively connected spiral shaped coils associated with respective ceiling tiles, The inlet of the first spiral shaped coil is furthermore connected to a heat exchange fluid supply pipe whereas the, outlet of the last spiral shaped coil is connected to a heat exchange fluid return pipe.

BRIEF DESCRIPTION OF THE DRAWINGS

Other objects and advantages of the present invention will be apparent from the following description in conjunction with the accompanying drawings, in which:

FIG. 3 is a cross section of the coil of FIG. 2;

FIG. 4 is a perspective view illustrating a series of interconnected coils positioned on their respective ceiling tiles;

PREFERRED EMBODIMENT

Figure 1:
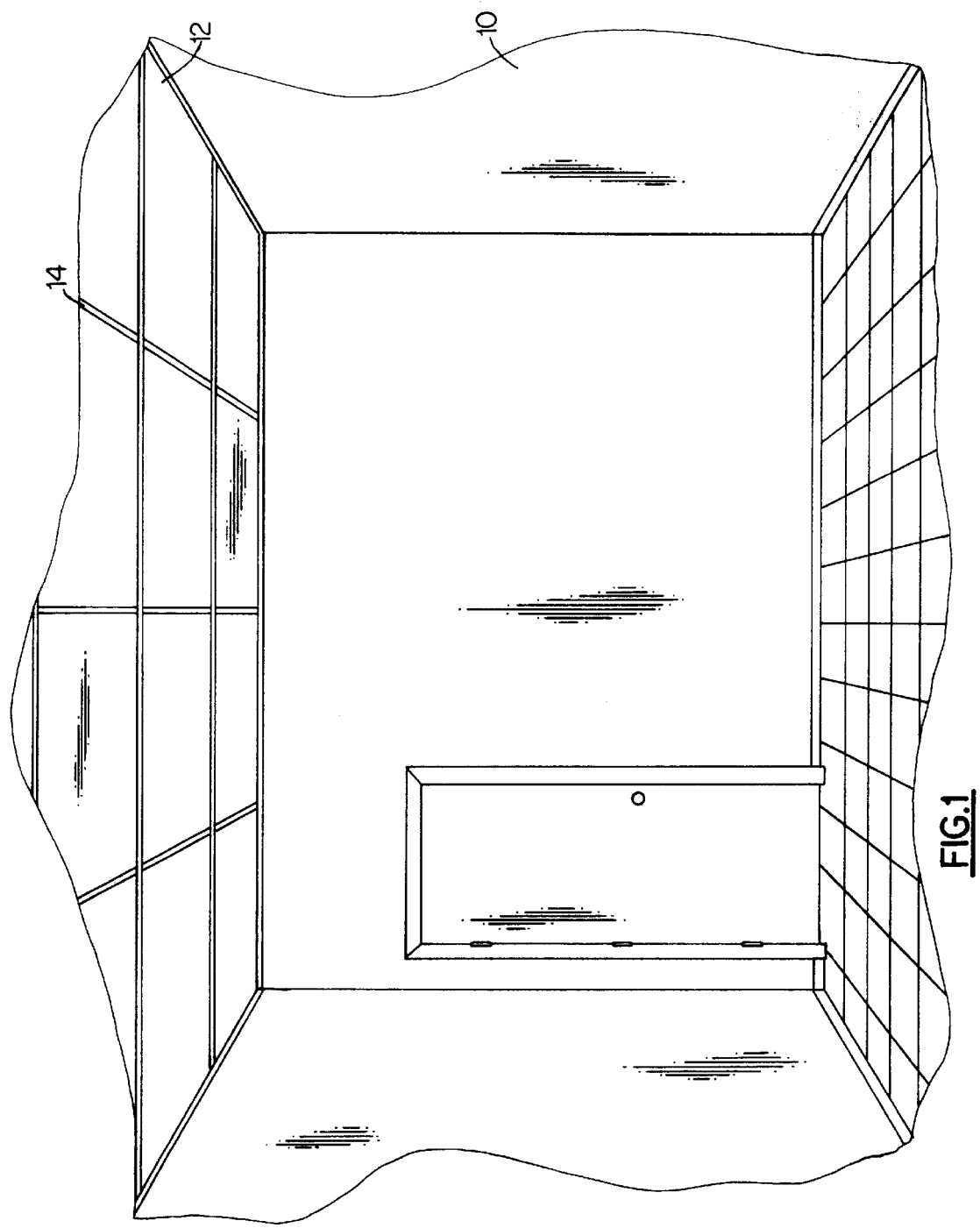
FIG. 1 illustrates a room having a suspended ceiling consisting of a number of individually mounted ceiling ties for heating or cooling the room.

Referring to FIG. 1, a room 10 is seen to include a suspended ceiling comprising a number of ceiling tiles, such as 12, each individually mounted within a ceiling support structure 14. Each ceiling tile 12 is preferably made of galvanized steel sheet metal that is five to eight tenths of a millimeter thick. The sheet metal is preferably perforated with holes having a diameter in the range of one-half to three millimeters. The resulting holes preferably constitute between ten and thirty percent of the total exposed surface of the tile 12.

Figure 2:
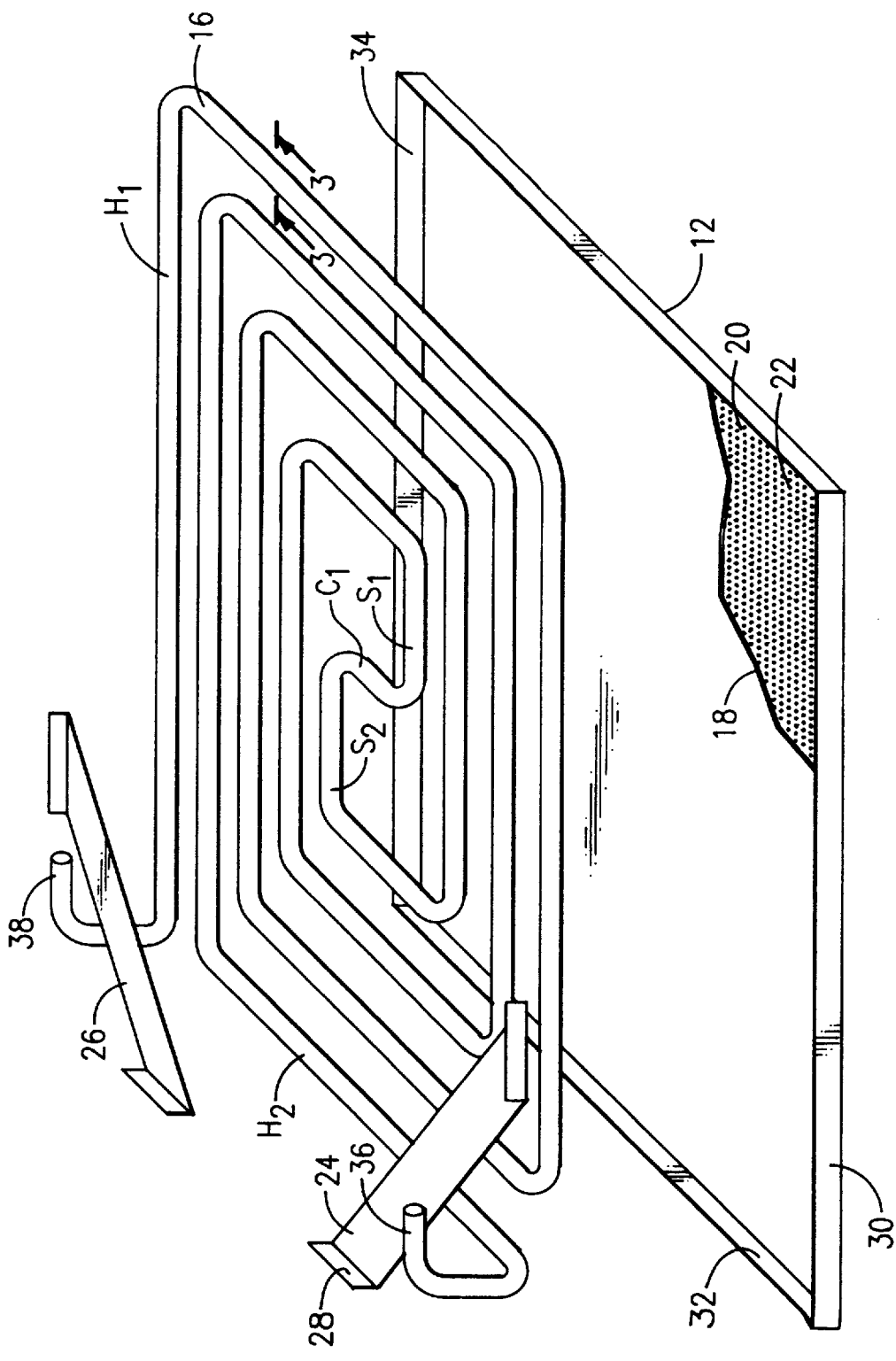
FIG. 2 is a perspective view of a coil to be positioned on a particular ceiling tile within the suspended ceiling of FIG. 1.

Referring to FIG. 2, the top side of the ceiling tile 12 is illustrated relative to a coil 16 that is to be positioned on the top surface of the ceiling tile 12. The top side of the ceiling tile 12 is seen to include a thin acoustical lining 18 glued to the perforated galvanized steel sheet 20 having the one-half to three millimeter diameter holes 22. The acoustical lining is preferably two tenths of a millimeter thick and consists of a cellulose glass fiber with synthetic resin binder. Such acoustical lining is well known and available from a number of sources including the Carl Freidenberg Company of Weinheim, Germany. It is to be appreciated that the top side of the ceiling tile 12 need not include the acoustical lining 18. In this case, the coil 16 would be positioned on the top surface of the perforated galvanized steel sheet 20.

The coil 16 is preferably formed from continuous copper tubing having a wall thickness of nine tenths of a millimeter. The coil includes two spirals, $S_1$, and $S_2$ formed from the continuous copper tubing. The first spiral $S_1$ includes several substantially square helical loops with rounded or curved corners. The outermost of these square helical loops is helical loop $H_1$. These square helical loops bring the spiral $S_1$ inward toward the approximate center $C_1$ of the coil. The second spiral $S_2$ begins where the first spiral $S_1$ ends at the approximate center $C_1$. Spiral $S_2$ includes several substantially square helical loops that successively bring the spiral outwardly toward the periphery of the ceiling tile ending with square helical loop $H_2$. It is to be noted that the square helical loops in spiral $S_1$ decrease in size as the spiral approaches the center of $C_1$ of the coil whereas the square helical loops in $S_2$ increase in size as the spiral moves outwardly. It is to furthermore be appreciated that alternatively shaped helical loops are also possible according to the invention. In particular, the helical loops in spiral $S_1$ may, for instance, be continuously curved loops with decreasing radius of curvatures whereas the helical loops in spiral $S_2$ may have correspondingly increasing radius of curvatures. As will be shown hereinafter, the helical loops may also be rectangular in shape. Referring to FIG. 3, a cross sectional view of helical loop $H_1$ is illustrated. The helical loop $H_1$ is seen to have a flat surface of width "W". This flat surface is preferably present in all of the helical loops of spirals $S_1$ and $S_2$. This flat surface that is common to all helical loops is preferably formed by flattening only the particular portion of the continuous tubing that has been bent and shaped into the spirals $S_1$ and $S_2$. It is to be appreciated that the number of helical loops in the formed spirals as well as the dimension of the contact width, W, can vary depending on the amount of desired heat exchange contact that is to be maintained between the coil and the top surface of the ceiling tile 12.

The coil 16 is preferably held in place on the top surface of the ceiling tile 12 by a pair of corner holding pieces 24 and 26, having edges such as 28 that are preferably clinched to the sides 30, 32 and 34 of the ceiling tile 12. The corner holding pieces 24 and 26 exert a slight amount of pressure on the contacted portions of the coil 16 so as to thereby maintain the coil in place relative to the ceiling tile 12. The corner holding piece 24 furthermore stabilizes an upwardly projecting and bent end 36 of the coil whereas the corner holding piece 26 stabilizes an upwardly projecting and bent end 38 of the coil. The remaining portion of the coil is preferably free of any restraints so as to thereby allow the coil to rest freely on the top surface of the ceiling tile 12.

The coil 16 may additionally be bonded to the top surface of the ceiling tile 12 by nontoxic, solvent free polyurethane adhesive having an aluminum powder added thereto for improved heat conductivity. The adhesive should be solvent free so as to avoid adverse chemical reaction with the acoustical lining 18. The solvent free nature of the adhesive also reduces the odor and flammability of the adhesive connection between the coil and ceiling tile.

Referring to FIG. 4, a series of coils are seen to be interconnected to each other by flexible hose connections 40, 42 and 44. The inlet end of a first coil 46 in this series is furthermore connected by a flexible hose connection 48 to a cold or warm water supply line 50. The outlet end of a last coil 52 in this series of coils is connected via a flexible hose connection 54 to a cold or warm water return fine 56. It is to be appreciated that water supply lines and return lines are provided to each series of interconnected coils in FIG. 3. In this manner, water is successively circulated through each series of coils i contact with their respective ceiling tiles.

Figure 5:
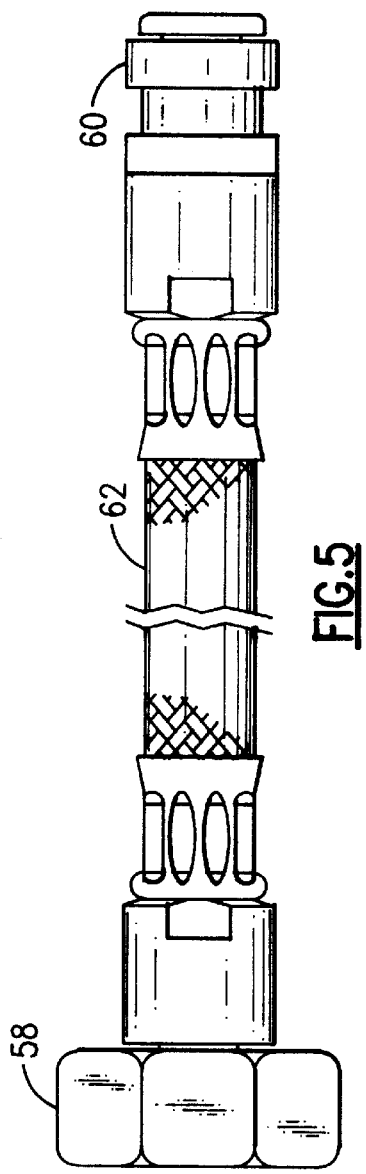
FIG. 5 illustrates a flexible hose connection used to connect water distribution pipes to the coils of FIG. 4.

Referring to FIG. 5, the hose connection used to connect either the water supply line 50 to the inlet of the coil 46 or the outlet of the coil 52 to the return fine 56 is further illustrated. The flexible hose connection preferably includes a rotatably mounted threaded nut end 58, which engages a threaded extension from either the water supply line 50 or the water return line 56. A rotatably mounted quick connect end 60 captures the end of the inlet end of the coil 48 when connection is to be completed to supply line 50. The same rotatably mounted quick connect end captures the outlet end of coil 52 when connection is to be completed to water return fine 56. The quick connect end 60 must be capable of positively gripping the tubing of the coil without scoring the tubing. Such quick connect ends typically include a sleeve clutch that provides a positive grip on the coil tubing. These quick connect ends furthermore typically include one or more "O" rings that form a seal around the positive grip made by the sleeve clutch. It is to be appreciated that such quick connect ends are well known and commercially available from a number of sources. The quick connect end used in the preferred embodiment was obtained from Groupe Legris Industries of France. The flexible hose 62 between the threaded nut end 58 and the quick connect end 60 is preferably a silicon rubber hose rotatably mounted with respect to the threaded nut end 58 and the quick connect end 60. The flexible hose 62 must have sufficient flexibility and length to allow the ceiling tile associated with the thus connected coil to be rotated downwardly from the support frame in which it is mounted in. Such downward rotation may be necessary in order to gain access to the particular coil.

Figure 6:
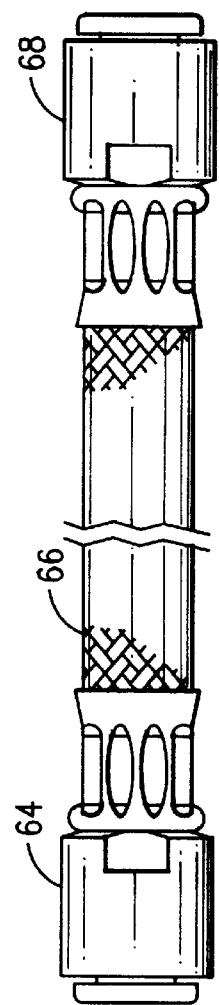
FIG. 6 illustrates a flexible hose connection used to interconnect the coils of FIG. 4.

Referring to FIG. 6, an example of the flexible hose connections 40, 42 and 46 that are preferably used to connect the inlet and outlet ends of successive coils is illustrated in detail. The flexible hose connection of FIG. 6 preferably includes a flexible hose 62 and two rotatably mounted quick connect ends 64 and 66. Each of these quick connect ends positively grips either an inlet or an outlet end of a coil so as to form one of the flexible hose connections shown in FIG. 4. The quick connect ends are preferably the same as the previously described quick connect end 60. The flexible hose 62 is preferably a silicone rubber hose of sufficient length and flexibility to allow examination of a connected coil associated with a particular ceiling tile by rotating the tile downwardly from the support frame in which it is mounted.

Figure 7:
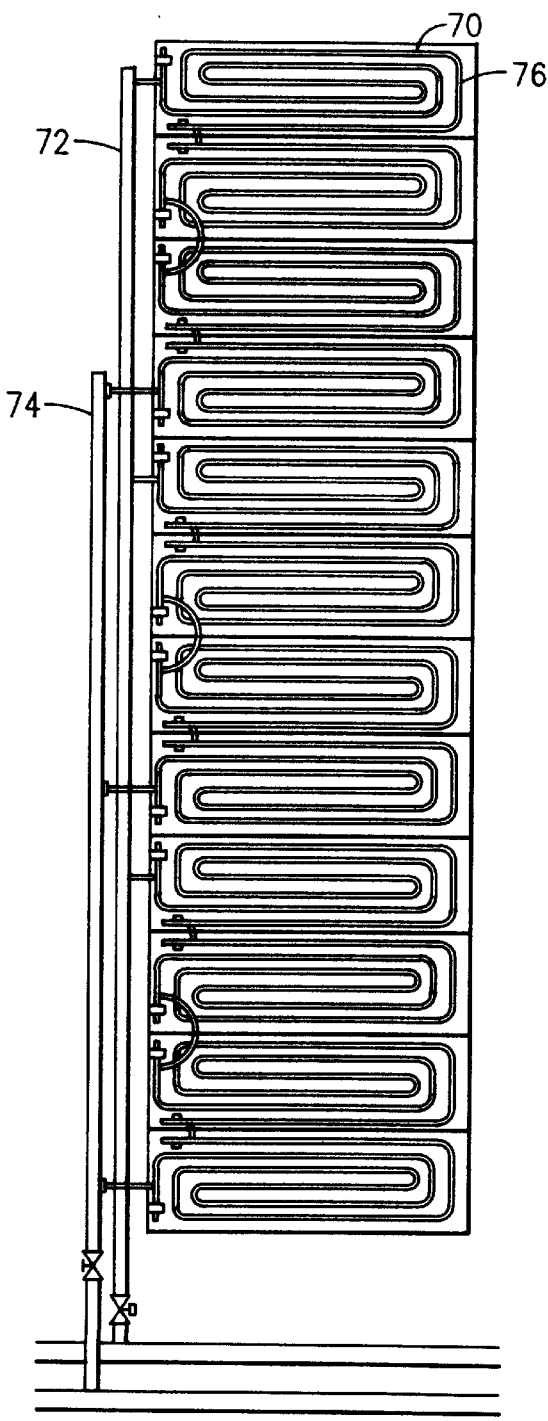
FIG. 7 is a schematic illustration of alternatively shaped spiral coils that are interconnected to each other in a different manner than the coils of FIG. 3.

Referring to FIG. 7, an alternatively shaped set of coils to those shown in FIG. 3 are schematically illustrated. In particular, a series of rectangular helical loops forming coils such as 70 are seen to be connected to a water supply line 72 and a water return line 74. As can be seen, groups of four of these coils form a water coolant path between the water supply line 72 and the water return line 74. Each rectangular shaped coil has a rectangular ceiling tile associated therewith such as ceiling tile 76 for coil 72.

Figure 9:
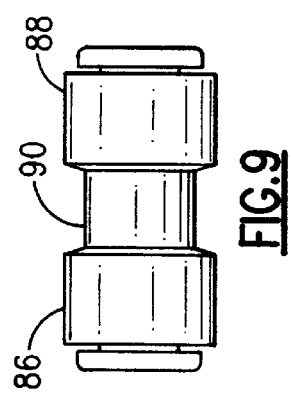
FIG. 9 illustrates the connection used to interconnect the coils of FIG. 8.
Figure 8:
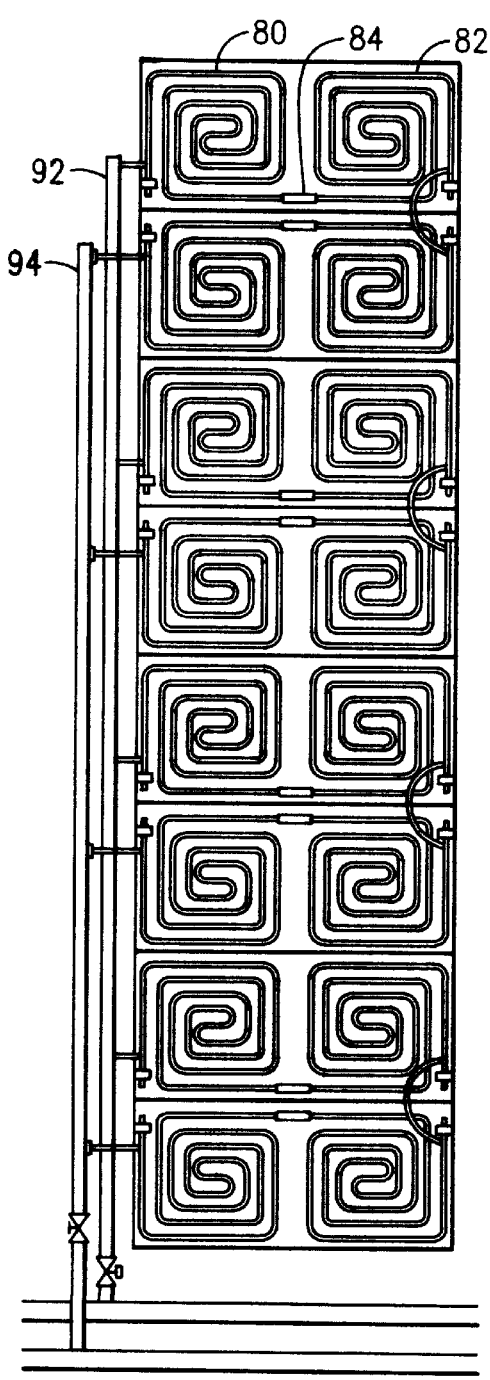
FIG. 8 is a schematic illustration of yet another series of spiral shaped coils interconnected to each other in a different manner than the coils of FIG. 3.

Referring to FIG. 8, another alternative arrangement of coils is schematically illustrated. In particular, a series of spiral shaped coils such as 80 and 82 are grouped together in pairs with connection 84 being used to interconnect the respective ends of the coils to be joined together. The connection 84 is illustrated in FIG. 9. This connection is seen to consist of two quick connect ends 86 and 88 rotatably mounted to a sleeve 90. The quick connect ends are preferably the same as the previously discussed quick connect end 60. Referring again to FIG. 8, the resulting paired coils are grouped together in groups of two so as to define water coolant paths between water supply line 92 and water return line 94.

It is to be appreciated that a preferred embodiment and two alternative embodiments of the invention have been described. Alterations, modifications and improvements thereto will readily occur to those tilled in the art. For instance, the cooling the coils could be interconnected in any number of different configurations to define water paths between water supply and water return lines. Furthermore, the shape of the coils and ceiling tiles could change.

Accordingly, the foregoing is by way of example only and the invention is to be limited only by the following claims and equivalents thereto.

What is claimed is:

1. Apparatus for heating or cooling a space comprising:
   a plurality of heat conducting ceiling tiles suspended above the space to be heated or cooled;
   a plurality of spiral shaped coils in thermally conductive contact with said plurality of heat conducting tiles, said spiral shaped coils each having a spiral shape allowing the coil to maintain substantial physical contact with the ceiling tile beneath the coil even when the ceiling tile beneath the coil flexes, bends or sags; and
   at least one heat exchange fluid supply line and at least one heat exchange fluid return line connected to said plurality of coils so as to define at least one path of heat exchange fluid through said plurality of spiral shaped coils in thermally conductive contact with said plurality of heat conducting tiles.

2. The apparatus of claim 1 wherein each o f said spiral shaped coils has an inlet and an outlet and wherein at least the outlet of one spiral shaped coil is flexibly connected to an inlet of an adjacent spiral shaped coil.

3. The apparatus of claim 2 wherein at least one of said spiral shaped coils has an inlet flexibly connected to said heat exchange fluid supply line and at least one of said spiral shaped coils has an outlet flexibly connected to said heat exchange fluid return line.

4. The apparatus of claim where the outlet of at least one spiral shaped coil is flexibly connected to the inlet of the adjacent coil by a flexible hose connection having sufficient length and flexibility so as to allow a heat conducting tile associated with either coil to be partially removed from its suspended position.

5. The apparatus of claim 1 wherein each of said spiral shaped coils comprise:
   a firsts spiral defining a continuous spiral path of heat exchange fluid to the approximate center of the coil; and
   a second spiral defining a continuous spiral path of heat exchange fluid away from the center of the coil.

6. The apparatus of claim 1 wherein the first and second spirals of each of said plurality of coils have a flat surface in thermally conductive contact with the top surface of a heat conducting ceiling tile associated with the respective coil.

7. The apparatus of claim 1 wherein each of said heat conducting ceiling tiles comprises:
   a thin piece of galvanized sheet metal formed into the shape of a ceiling tile.

8. The apparatus of claim 7 wherein each thin piece of galvanized sheet metal formed to the shape of a ceiling tile is substantially perforated.

9. The apparatus of claim 8 wherein the top surface of each thin piece of galvanized sheet metal has an acoustical layer attached thereto, said acoustical layer on the top surface of each thin piece of galvanized sheet metal being in physical contact with the bottom surface of at least one of the spiral shaped coils.

* * * * *